United States Patent
Chu

(10) Patent No.: US 9,436,294 B2
(45) Date of Patent: Sep. 6, 2016

(54) ADJUSTING METHOD FOR BUTTON FUNCTIONS IN ELECTRONIC DEVICE AND RELATED APPARATUS

(71) Applicant: Wistron Corporation, New Taipei (TW)

(72) Inventor: Chien-Ming Chu, New Taipei (TW)

(73) Assignee: Wistron Corporation, New Taipei (TW)

( * ) Notice: Subject to any disclaimer, the term of this patent is extended or adjusted under 35 U.S.C. 154(b) by 290 days.

(21) Appl. No.: 14/011,768

(22) Filed: Aug. 28, 2013

(65) Prior Publication Data
US 2014/0210651 A1 Jul. 31, 2014

(30) Foreign Application Priority Data
Jan. 29, 2013 (TW) .............................. 102103307 A

(51) Int. Cl.
| | | |
|---|---|---|
| H03K 17/94 | (2006.01) | |
| H03M 11/00 | (2006.01) | |
| G07C 9/00 | (2006.01) | |
| G06F 3/02 | (2006.01) | |
| G09G 5/00 | (2006.01) | |
| H01H 9/26 | (2006.01) | |
| H01H 13/72 | (2006.01) | |
| H01H 13/76 | (2006.01) | |
| G06F 3/023 | (2006.01) | |
| G06F 1/16 | (2006.01) | |

(52) U.S. Cl.
CPC ............. *G06F 3/0238* (2013.01); *G06F 1/169* (2013.01); *G06F 1/1694* (2013.01)

(58) Field of Classification Search
USPC ............................. 341/21–34; 345/156–184; 340/1.1–16.1; 348/734; 200/5 R–5 E
See application file for complete search history.

(56) References Cited

U.S. PATENT DOCUMENTS

| | | | | |
|---|---|---|---|---|
| 2006/0176278 A1* | 8/2006 | Mathews | ................. | G09G 3/20 345/168 |
| 2008/0062134 A1* | 3/2008 | Duarte | ................. | G06F 1/1624 345/169 |
| 2009/0207134 A1* | 8/2009 | Spilo | ......................... | G06F 3/02 345/158 |
| 2012/0206332 A1* | 8/2012 | Yonemoto | ............. | G06F 1/1694 345/156 |

FOREIGN PATENT DOCUMENTS

| | | |
|---|---|---|
| TW | 200915370 | 4/2009 |
| TW | 201239679 | 10/2012 |
| TW | 201239679 A1 | 10/2012 |

OTHER PUBLICATIONS

Office action mailed on Sep. 29, 2014 for the Taiwan application No. 102103307, filing date: Jan. 29, 2013, p. 1 line 1-14, p. 2-3 and p. 4 line 1-24.
Office action mailed/issued on May 30, 2016 for CN application No. 201310054579.5, pp. 3-6.

* cited by examiner

*Primary Examiner* — Firmin Backer
*Assistant Examiner* — Jerold Murphy
(74) *Attorney, Agent, or Firm* — Winston Hsu; Scott Margo

(57) ABSTRACT

An adjusting method for button functions, used in an electronic device having a plurality of buttons respectively corresponding to at least one key value, is disclosed. The method includes determining an angle of the electronic device corresponding to a predefined direction; and adjusting the relationship between each of the plurality of buttons and the at least one key value according to the angle.

6 Claims, 6 Drawing Sheets

ADJUSTING METHOD FOR BUTTON FUNCTIONS IN ELECTRONIC DEVICE AND RELATED APPARATUS

BACKGROUND OF THE INVENTION

1. Field of the Invention

The present invention is related to an adjusting method for button functions and related apparatus, and more particularly, to an adjusting method and apparatus for adjusting button functions according to an angle corresponding to a predefined direction.

2. Description of the Prior Art

With the improvement of information and communication technology, many electronic devices, such as mobile phones, tablet personal computers, laptops, electronic readers, and so on, can perform vertical operations or horizontal operations. However, the conventional vertical or horizontal operations switch the displaying direction but not adjust corresponding button functions, so that the conventional operations do not conform to users' habits.

In detail, please refer to FIG. 1A, which is a schematic diagram of a mobile phone 10 according to the prior art. The mobile phone 10 includes a first button 100 and a second button 102. The first button 100 set at the upper position of the mobile phone 10 is used for increasing volume and the second button 102 set at the lower position of the mobile phone 10 is used for decreasing volume correspondingly. When the mobile phone 10 is rotated 180 degrees by a user as shown in FIG. 1B, the corresponding positions of the first button 100 and the second button 102 are exchanged; the first button 100 is set at the lower position and the second button 102 is set at the upper position. However, the functions of the first button 100 and the second button 102 are not exchanged in the prior art. Therefore, the user is not able to correctly determine that the upper button is the first button 100 for increasing volume or the second button 102 for decreasing volume so as to cause the opposite result, or should change the original habit in the up and down direction temporarily even when the user can correctly determine the function of the used button. Therefore, it is inconvenient for the user to operate the mobile phone 10.

As such, if the button functions of the electronic device can be adjusted according to the using angle of the electronic device, the user can execute the button functions of the electronic device intuitively.

SUMMARY OF THE INVENTION

The present invention therefore provides an adjusting method for button functions and electronic device, to adjust button functions according to an angle of an electronic device corresponding to a predefined direction, to make the button function of the electronic device become intuitive, and to facilitate operations for users.

An adjusting method for button functions used in an electronic device comprising a plurality of buttons respectively corresponding to at least one key value is disclosed. The method comprises determining an angle of the electronic device corresponding to a predefined direction; and adjusting the relationship between each of the plurality of buttons and the at least one key value according to the angle.

An electronic device is disclosed. The electronic device comprises a plurality of buttons, corresponding to at least one key value; an angle detector, for detecting an angle of the electronic device corresponding to a predefined direction; and a control module, coupled to the plurality of buttons and the angle detector, for adjusting the relationship between each of the plurality of buttons and the at least one key value according to the angle.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
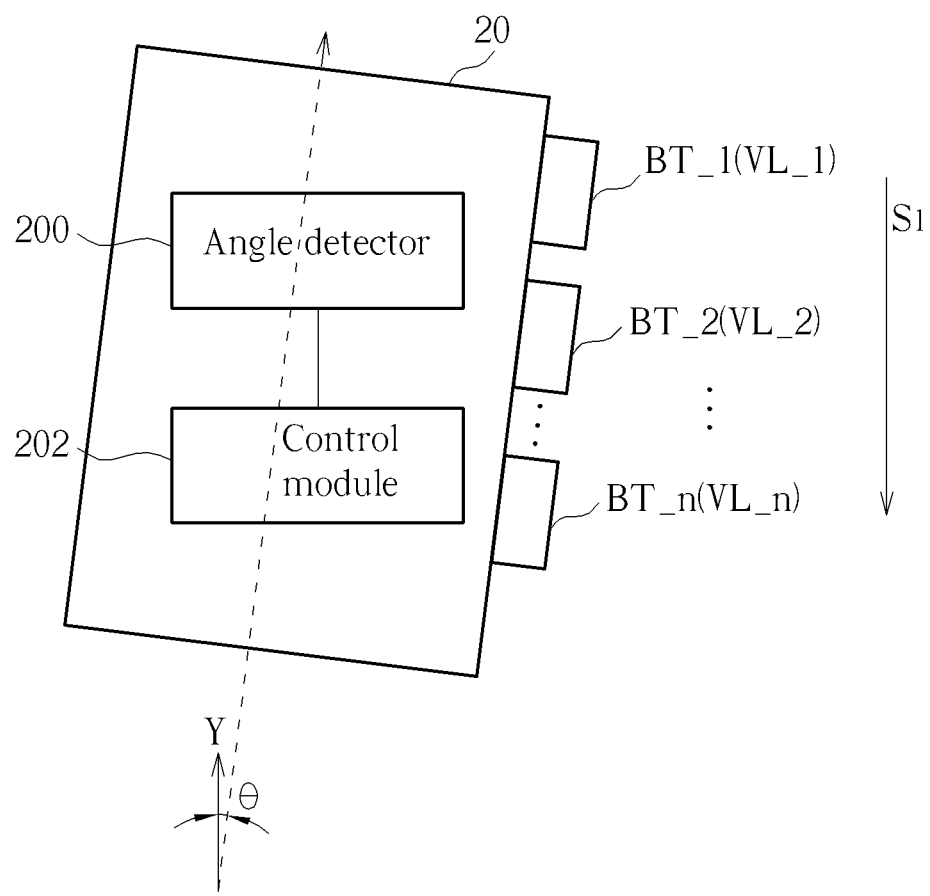
FIGS. 2A and 2B are schematic diagrams of an electronic device according to an exemplary embodiment of the present invention.
Figure 2B:
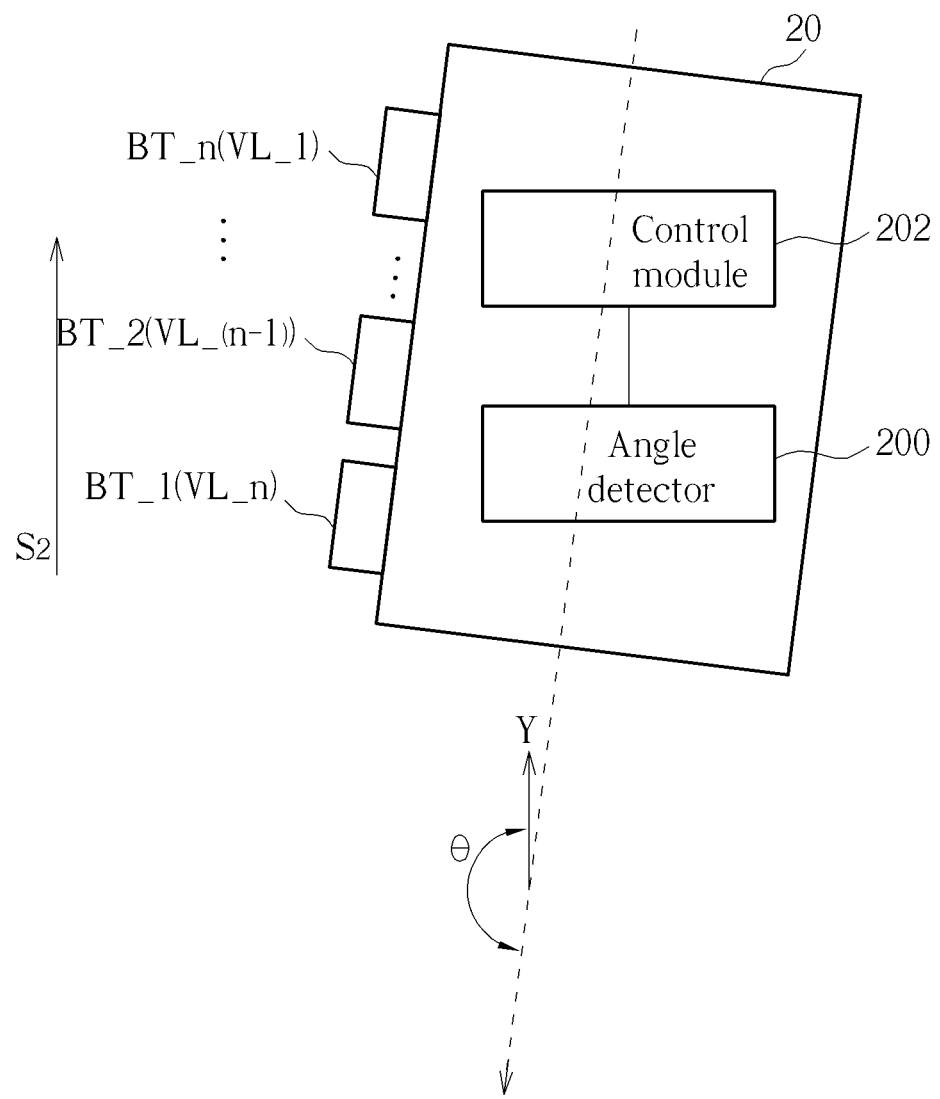

Please refer to FIGS. 2A and 2B, which are schematic diagrams of an electronic device 20 according to a first exemplary embodiment of the present invention. The electronic device 20 can be any portable electronic device with button functions such as a smart phone, a tablet personal computer, a laptop, an electronic reader, and so on, but not limited herein. The buttons $BT\_1 \sim BT\_n$, an angle detector 200 and a control module 202 are simply used for illustrating the structure of the electronic device 20. Those skilled in the art can adjust the structure of the electronic device 20 according to the system requirements. An amount of the buttons $BT\_1 \sim BT\_n$ is not limited to be any specific value, i.e. n can be any positive integer larger than one. The buttons $BT\_1 \sim BT\_n$ are used for controlling at least one parameter of at least one function such as volume, display zooming, page switch, and so on. Moreover, the parameter can be any changeable value relationship such as size, strength, scale, back and forth, up and down and so on. Besides, as shown in FIG. 2A, the buttons $BT\_1 \sim BT\_n$ correspond to key values $VL\_1 \sim VL\_n$ sequentially in a forward order. In FIG. 2B, the buttons $BT\_1 \sim BT\_n$ correspond to the key values $VL\_1 \sim VL\_n$ sequentially in a backward order. Therefore, in brief and simplicity, the forward relationship between the buttons $BT\_1 \sim BT\_n$ and the key values $VL\_1 \sim VL\_n$ in FIG. 2A is named as a first button function sequence S1 and the backward relationship between the buttons $BT\_1 \sim BT\_n$ and the key values $VL\_1 \sim VL\_n$ in FIG. 2B is named as a second button function sequence S2. In addition, the angle detector 200 can be a gravity sensor, a gyroscope, and so on. The angle detector 200 is used for detecting an angle θ of the electronic device 20 corresponding to a gravity direction. The control module is coupled to the buttons $BT\_1 \sim BT\_n$ and the angle detector 200 for corresponding the buttons $BT\_1 \sim BT\_n$ to the key values $VL\_1 \sim VL\_n$ according to the first button function sequence S1 or the second button function sequence S2, to adjust the function setting of the buttons $BT\_1 \sim BT\_n$. The control module 202 can be a microprocessor or Application Specific Integrated Circuit (ASIC).

In brief, in the electronic device 20, the angle detector 200 can detect the angle θ of the electronic device 20 corresponding to the gravity direction Y. The control module 202 can adjust the corresponding relationship between the buttons BT_1~BT_n and the key values VL_1~VL_n according to the angle θ. For example, when the user holds the electronic device 20 as shown in FIG. 2A, the control module 202 controls the buttons BT_1~BT_n to correspond to the values VL_1~VL_n according to the first button function sequence S1, i.e. the button BT_1 corresponds to the key value VL_1, the button BT_2 corresponds to the key value VL_2, and so on. On the contrary, when the user changes to hold the electronic device 20 as shown in FIG. 2B, i.e. the electronic device 20 is rotated 180 degrees in comparison with that of FIG. 2A, the control module 202 controls the buttons BT_1~BT_n to correspond to the values VL_1~VL_n according to the second button function sequence S2, i.e. the button BT_1 corresponds to the key value VL_n, the button BT_2 corresponds to the key value VL_(n−1), and so on. Therefore, no matter how the electronic device 20 is held, the uppermost button of the buttons BT_1~BT_n is always configured with the key value VL_1, the next button is configured with the key value VL_2, and so on to the lowerest button configured with the key value VL_n. Therefore, the user can change the corresponding button functions of the electronic device 20 intuitively according to an up and down direction (which is the example of the present invention), but not adjust the user habit according to the holding method.

Note that, the electronic device 20 is an example of the present invention, and those skilled in the art can readily make combinations, modifications and/or alterations to the abovementioned description and examples. For example, the gravity direction Y can also be replaced by a horizontal direction or a diagonal direction of the electronic device 20. The first button function sequence S1 and the second button function sequence S2 is opposite and can be replaced by another sequential relationship. Besides, in order to correctly adjust the corresponding relationship of the buttons BT_1~BT_n and the key values VL_1~VL_n, the control module 200 compares the angle θ with a predefined angle $θ_f$. When the angle θ is larger than the predefined angle $θ_f$, the buttons BT_1~BT_n corresponds to the key values VL_1~VL_n according to the second button function sequence S1; when the angle θ restores to be smaller than the predefined angle $θ_f$, the control module 200 changes to correspond the buttons BT_1~BT_n to the key values VL_1~VL_n according to the first button function sequence S1. Besides, the predefined angle $θ_f$ can be a region, to prevent a ping-pong effect. On the other hand, the abovementioned adjusting method can be performed with the user's habit collaboratively. For example, the button function sequences chosen for a left-handed user can be different from those for a right-handed user.

Figure 1A:
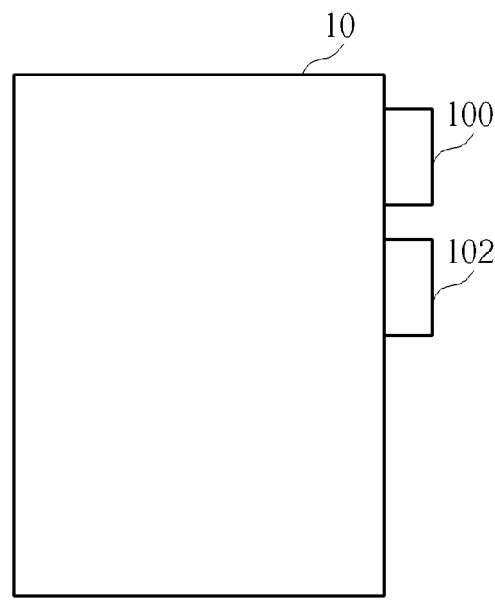
FIGS. 1A and 1B are schematic diagrams of a mobile phone according to the prior art.
Figure 1B:
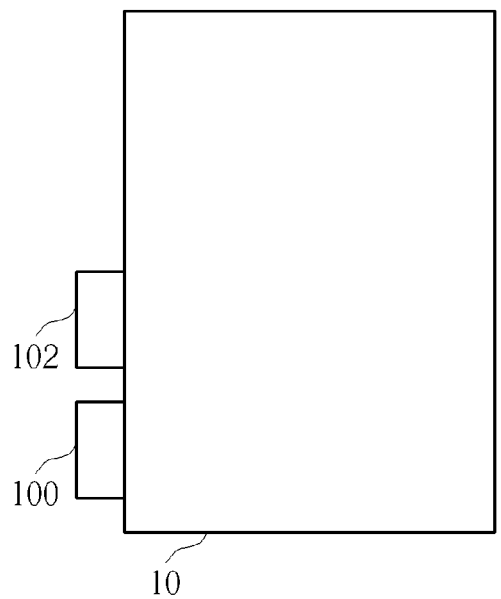

Therefore, when the angle detector 200 detects that the angle θ of the electronic device 20 corresponding to the gravity direction Y is changed, the control module 200 adjusts the function setting of the buttons BT_1~BT_n accordingly, to make the operations intuitive and further facilitate the operations for the user. For example, if an amount of the buttons BT_1~BT_n is two, i.e. n=2, the key values VL_1 and VL_2 respectively correspond to the functions of increasing and decreasing volume and the predefined angle $θ_f$ is 90 degrees. Therefore, when the user operates the electronic device 20 between 90 degrees and −90 degrees (the angle θ is smaller than the predefined angle $θ_f$), the buttons BT_1 and BT_2 respectively correspond to the key value VL_1 and VL_2 according to the first button function sequence S1, i.e. the button BT_1 is used for increasing volume and the button BT_2 is used for decreasing volume; when the user rotates the electronic device 20 out of the region between the 90 degrees and −90 degrees (the angle θ is larger than the predefined angle $θ_f$), the buttons BT_1 and BT_2 respectively correspond to the key value VL_2 and VL_1 according to the second button function sequence S2, i.e. the button BT_1 is changed for decreasing volume and the button BT_2 is changed for increasing volume. In such a situation, since the angle θ is over the predefined angle $θ_f$ while the user rotates the electronic device 20 and the angle θ corresponding to the gravity direction Y is 180 degrees, the control module 202 adjusts the buttons BT_1 and BT_2 respectively corresponding to the key values VL_2 and VL_1 according to the second button function sequence S2, so that the function of the button BT_1 is decreasing volume instead of increasing volume and the function of the button BT_2 is increasing volume instead of decreasing volume. In other words, the buttons for controlling the volume increase is always retained in the upper position so that the user can control the volume of the electronic device 20 according to the up and down direction intuitively. In comparison, in the case of the conventional operations in FIGS. 1A and 1B, the button for increasing the volume may be changed from the upper position to the lower position, which does not conform to the user's habit and may cause incorrect control.

Figure 3A:
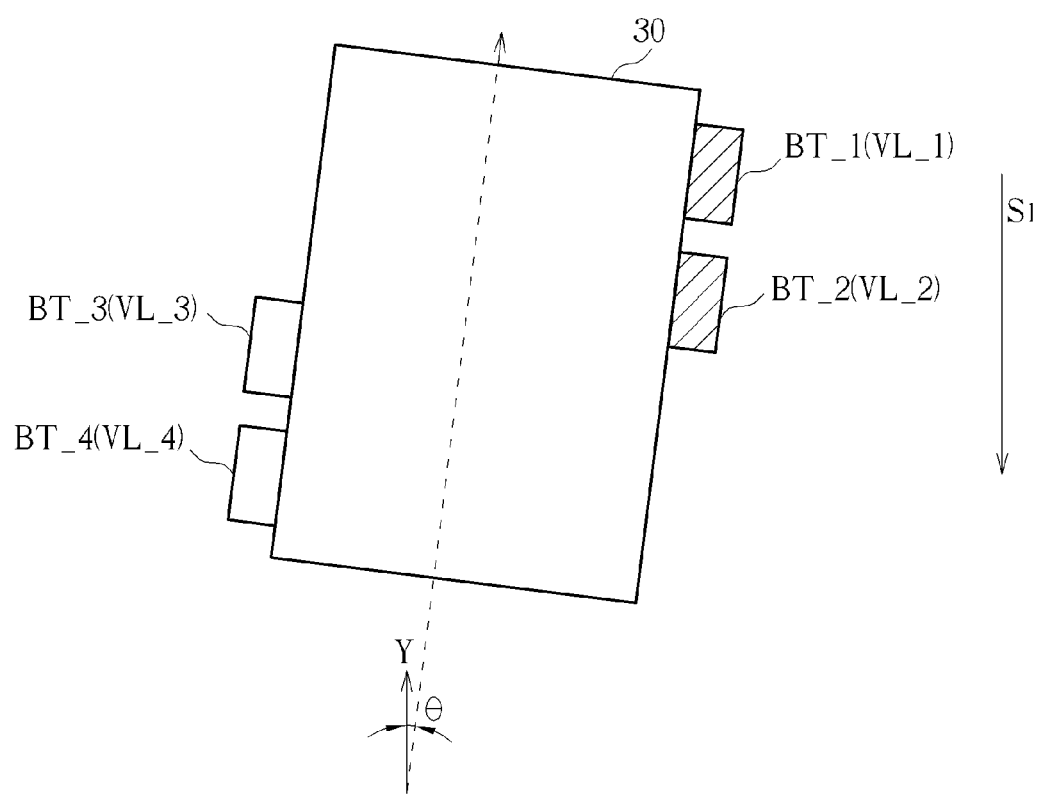
FIGS. 3A and 3B are schematic diagrams of an electronic device according to an exemplary embodiment of the present invention.
Figure 3B:
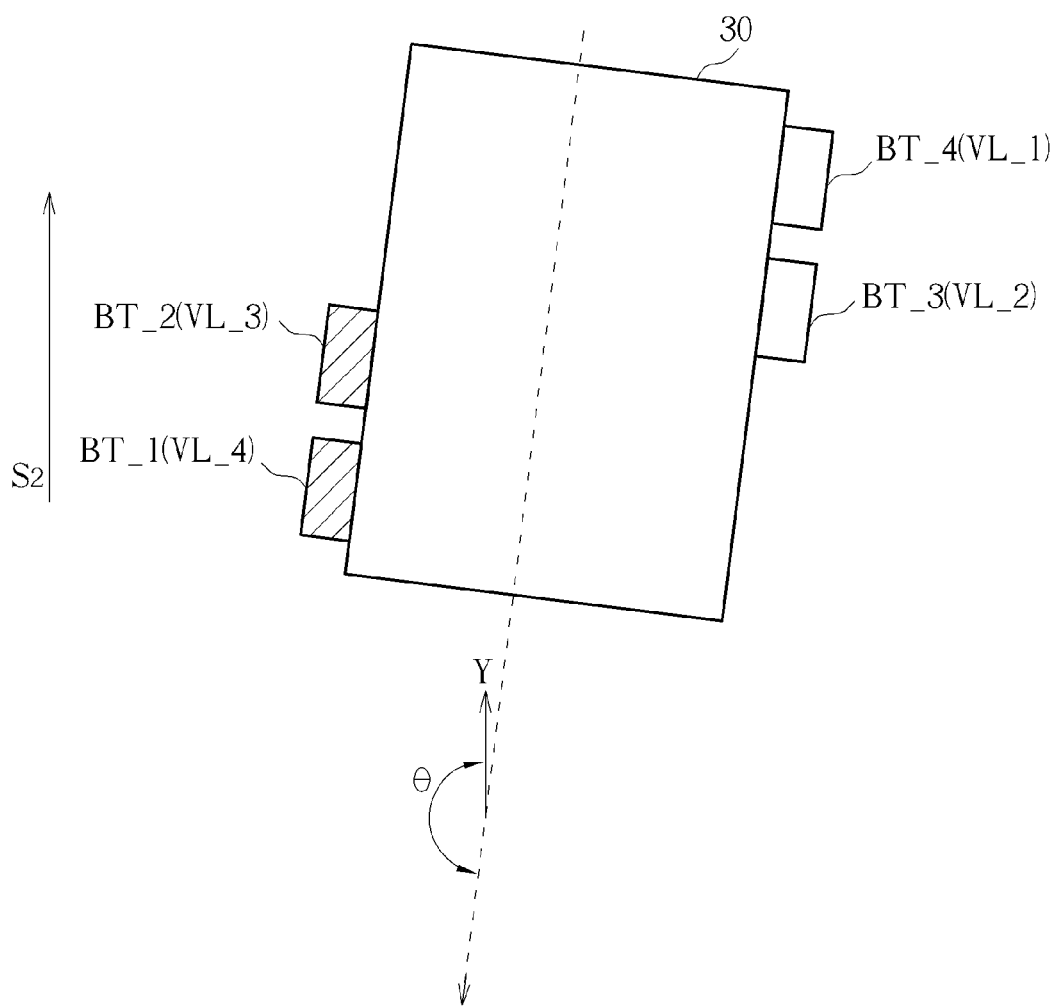

In addition, in FIGS. 2A and 2B, the buttons BT_1~BT_n are arranged in a sequence, which is convenient for explanation. Practically, the buttons BT_1~BT_n can be partitioned into several groups and a button function sequence for each group is configured. Please refer to FIGS. 3A and 3B, which are schematic diagrams of an electronic device 30 according to a second exemplary embodiment of the present invention. The electronic device 30 is modified from the electronic device 20. The difference between the electronic devices 20 and 30 is that the buttons of the electronic device 30 are distributed in two sides of the electronic device 30 instead of one side as the electronic device 20 does. In detail, in FIG. 3A, the buttons BT_1 and BT_2 of the electronic device 30 are allocated in the right of the electronic device 30 and the buttons BT_3 and BT_4 are allocated in the left of the electronic device 30. The buttons BT_1~BT_4 correspond to the key values VL_1~VL_4. The key values VL_1 and VL_2 are configured to correspond to the functions of volume increase and volume decrease, the key values VL_3 and VL_4 are configured to correspond to the functions of previous page switch and next page switch and the predefined angle $θ_f$ is configured to 90 degrees. When the angle θ is smaller than the predefined angle $θ_f$, the buttons BT_1~BT_4 respectively corresponds to the key value VL_1~VL_4 according to the first button function sequence S1, i.e. the button BT_1 is used for increasing volume, the button BT_2 is used for decreasing volume, the button BT_3 is used for switching to the previous page and the button BT_4 is used for switching to the next page; when the angle θ is larger than the predefined angle $θ_f$, the buttons BT_1~BT_4 respectively corresponds to the key value VL_4~VL_1 according to the second button function sequence S2, i.e. the button BT_1 is used for switching to the next page, the button BT_2 is used for switching to the previous page, the button BT_3 is used for decreasing volume and the button BT_4 is used for increasing volume. In such a situation, since the angle θ is over the predefined angle $θ_f$ while the user uses the operating method as shown in FIG. 3B instead of that in FIG. 3A, i.e. the user rotates the electronic device 30 and the angle θ corresponding to the gravity direction Y is 180 degrees, the control module of the electronic device 30 (which is not illustrated in FIGS. 3A and 3B) adjusts the buttons BT_1~BT_4 corresponding to the key values VL_4~VL_1 according to the second button function sequence S2, so that the function of the button BT_1 is switching to the next page instead of increasing volume, the function of the button BT_2 is switching to the previous page instead of decreasing volume, the function of the button BT_3 is decreasing volume instead of switching to the previous page, and the function of the button BT_4 is increasing volume instead of switching to the next page. In other words, the buttons for controlling the volume is always retained in the right side and the button for increasing volume is always retained in the upper position. The buttons for controlling page switch is always retained in the left side and the button for switching to the previous page is always retained in the upper position. As such, the user can operate the electronic device 30 intuitively.

When an electronic device performs rotating operations, the original button in the right side of the electronic device is changed to the left side of the electronic device or even the buttons in the right side of the electronic device and the buttons in the left side of the electronic device are exchanged and the up and down order for the buttons in the right or left side of the electronic device is exchanged. Those skilled in the art know that the buttons may be disposed in the upper or lower position or in the front or back position, so that the button function sequences can be configured for the up and down direction or the front and back direction according to the skill in the abovementioned examples, to achieve the goal of adjusting the button functions.

Figure 4:
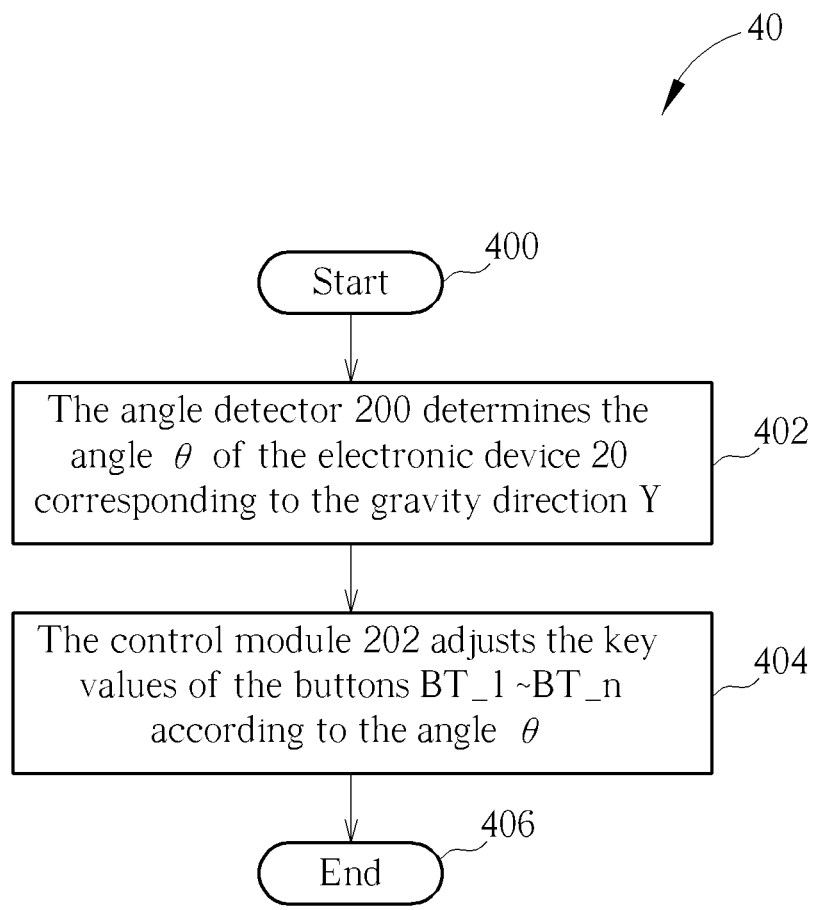
FIG. 4 is a schematic diagram of a flowchart according to an exemplary embodiment of the present invention.

The abovementioned operation related to the electronic device 20 can be summarized to a process 40, as shown in FIG. 4. The process 40 includes the following steps:

Step 400: Start.

Step 402: The angle detector 200 determines the angle θ of the electronic device 20 corresponding to the gravity direction Y.

Step 404: The control module 202 adjusts the key values of the buttons BT_1~BT_n according to the angle θ.

Step 406: End.

The process 40 explains the operating steps about adjusting the button functions according to the change of the angle of the electronic device 20. In detail, the electronic device 20 determines the angle θ of the electronic device 20 corresponding to the gravity direction Y via the angle detector 200 and further adjusts the key values of the buttons BT_1~BT_n according to the angle θ so as to adjust the corresponding button functions, to make the functions of the buttons BT_1~BT_n intuitive and facilitate the operations for the users. Since the process 40 is used for performing the operations of the electronic device 20, please refer to the above explanation for detailed principles.

In the prior art, the button functions of the electronic device are fixed and not adjusted with the operating angle of the electronic device cooperatively, so that the operations for the users are not convenient. In comparison, the present invention adjusts the button function by determining the operating angle of the electronic device so as to make the button functions of the electronic device intuitive and facilitate the operations for the users.

To sum up, in order to prevent the inconvenient operations due to the change of the operating angle for the user, the present invention automatically adjusts the button functions by determining the operating angle of the electronic device, to make the button functions of the electronic device intuitive and facilitate the operations for the users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjusting method for button functions, used in an electronic device comprising a plurality of buttons arranged in a first button order relative to a predefined direction and respectively corresponding to at least one key value all arranged in a first key value order when the plurality of buttons are in the first button order, the method comprising:
    determining an angle of the electronic device corresponding to the predefined direction; and
    reversing all of the plurality of buttons from the first button order to a second button order and maintaining the key values in the first key value order relative to the predefined direction when the angle is determined to be greater than a predefined angle, such that the plurality of buttons have different corresponding key values when the buttons are arranged in the second button order compared to when the buttons are arranged in the first button order, wherein the plurality of buttons are located at a same side of the electronic device, and wherein the at least one key value is associated with at least one function of the electronic device;
    wherein the at least one function comprises increasing volume and decreasing volume;
    wherein an amount of the plurality of buttons is more than 2.

2. The adjusting method of claim 1, wherein the predefined direction is a gravity direction.

3. The adjusting method of claim 1, further comprising when the angle restores from being larger than the predefined angle to being smaller than the predefined angle, reversing the plurality of buttons from the second button order to the first button order and maintaining the key values in the first key value order relative to the predefined direction.

4. An electronic device, comprising:
    a plurality of buttons, arranged in a first button order relative to a predefined direction and corresponding to at least one key value all arranged in a first key value order when the plurality of buttons are in the first button order;
    an angle detector, for detecting an angle of the electronic device corresponding to the predefined direction; and
    a control module, coupled to the plurality of buttons and the angle detector, reversing all of the plurality of buttons from the first button order to a second button order and maintaining the key values in the first key value order relative to the predefined direction when the angle is determined to be greater than a predefined angle, such that the plurality of buttons have different corresponding key values when the buttons are arranged in the second button order compared to when the buttons are arranged in the first button order, wherein the plurality of buttons are located at a same side of the electronic device, and wherein the at least one key value is associated with at least one function of the electronic device;
    wherein the at least one function comprises increasing volume and decreasing volume;
    wherein an amount of the plurality of buttons is more than 2.

5. The electronic device of claim 4, wherein the predefined direction is a gravity direction.

6. The electronic device of claim 4, when the angle restores from being larger than the predefined angle to being smaller than the predefined angle, reversing the plurality of buttons from the second button order to the first button order and maintaining the key values in the first key value order relative to the predefined direction.

* * * * *